(12) United States Patent
Dahlman et al.

(10) Patent No.: US 11,750,273 B2
(45) Date of Patent: Sep. 5, 2023

(54) METHODS AND APPARATUSES FOR RESOURCE CONFIGURATION OF IAB BASED ON CAPABILITY

(71) Applicant: TELEFONAKTIEBOLAGET LM ERICSSON (PUBL), Stockholm (SE)

(72) Inventors: Erik Dahlman, Stockholm (SE); Boris Dortschy, Hägersten (SE); Yezi Huang, Täby (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 14 days.

(21) Appl. No.: 17/632,906

(22) PCT Filed: Aug. 5, 2020

(86) PCT No.: PCT/IB2020/057406
§ 371 (c)(1),
(2) Date: Feb. 4, 2022

(87) PCT Pub. No.: WO2021/028785
PCT Pub. Date: Feb. 18, 2021

(65) Prior Publication Data
US 2022/0278741 A1    Sep. 1, 2022

Related U.S. Application Data

(60) Provisional application No. 62/887,347, filed on Aug. 15, 2019.

(51) Int. Cl.
H04B 7/15      (2006.01)
H04B 7/155     (2006.01)
H04W 84/04     (2009.01)

(52) U.S. Cl.
CPC ....... *H04B 7/15542* (2013.01); *H04W 84/047* (2013.01)

(58) Field of Classification Search
CPC .................. H04B 7/15542; H04W 84/047
See application file for complete search history.

(56) References Cited

U.S. PATENT DOCUMENTS

| | | | | |
|---|---|---|---|---|
| 2020/0337057 | A1* | 10/2020 | Abedini | H04B 7/0628 |
| 2020/0351930 | A1* | 11/2020 | Luo | H04W 24/08 |
| 2022/0078788 | A1* | 3/2022 | Tiirola | H04W 72/0446 |
| 2022/0095283 | A1* | 3/2022 | Wei | H04L 5/0003 |

(Continued)

OTHER PUBLICATIONS

3GPP TR 38.874 V16.0.0 (Dec. 2018) "Study on Integrated Access and Backhaul" (Release 16).

(Continued)

*Primary Examiner* — Hashim S Bhatti
(74) *Attorney, Agent, or Firm* — Ericsson Inc.

(57) ABSTRACT

A method in a first network node in an IAB network is provided. The method comprises: receiving capability information associated with a second network node, which has a first transceiver and a second transceiver, the capability information being related to an operation of the first transceiver at a first frequency and the second transceiver at a second frequency; configuring one or more resources associated with the first transceiver of the second network node based on the received capability information; and sending an indication of the configured resources to the second network node.

18 Claims, 9 Drawing Sheets

(56) References Cited

U.S. PATENT DOCUMENTS

2022/0166567 A1* 5/2022 Kurita ................... H04L 5/0003
2022/0217661 A1* 7/2022 Yokomakura .......... H04B 7/155

OTHER PUBLICATIONS

3GPP, "RAN1 Chairman's Notes", TSG RAN WG1 Meeting #96bis, Xi'an, China, Apr. 8-12, 2019.
Ericsson, "IAB resource allocation and multiplexing (revision of R1-1813566)", 3GPP TSG-RAN WG1 Meeting #95, Nov. 15, 2018, pp. 1-6, Spokane U S A.
Intel Corporation, "Mechanism for Resource Multiplexing among Backhaul and Access links", 3GPP TSG RAN WG1 #97, R1-1906792, May 13, 2019, pp. 1-8, Reno, U.S.A.
Qualcomm Incorporated, "Source Management in IAB Network", 3GPP TSG RAN WG1 Meeting #95, No. 11, 2018, R1-1813419, pp. 1-8, Spokane, USA.
International Search Report and Written Opinion issued on Applicant's PCT International Application No. PCT/IB2020/057406.

* cited by examiner

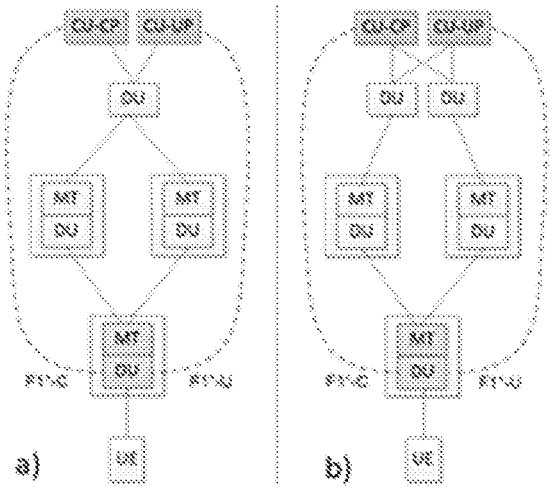
Figures 6a) and 6b)
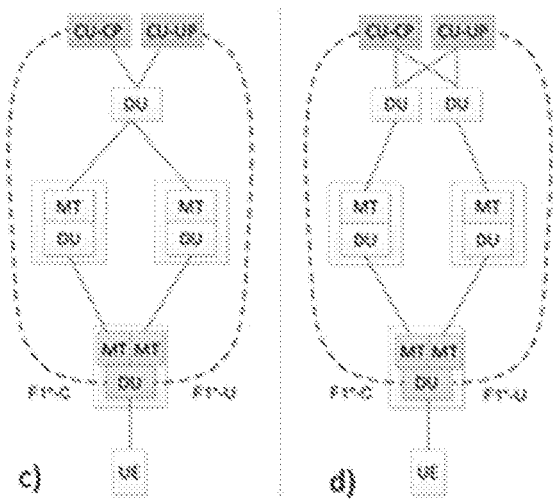
Figures 6c) and 6d)

METHODS AND APPARATUSES FOR RESOURCE CONFIGURATION OF IAB BASED ON CAPABILITY

RELATED APPLICATIONS

The application claims the benefits of priority of U.S. Provisional Patent Application No. 62/887,347, entitled "Capability-based IAB DU resource configuration" and filed at the United States Patent and Trademark Office on Aug. 15, 2019, the content of which is incorporated herein by reference

TECHNICAL FIELD

The present description generally relates to wireless communication systems and more specifically to configuring resources based on signaled capability of a distributed unit (DU) of an Integrated Access and Backhaul (IAB) node.

BACKGROUND

Integrated Access and Backhaul Overview

Densification via the deployment of more and more base stations (either macro or micro base stations) is one of the mechanisms that can be employed to satisfy the ever-increasing demand for more and more bandwidth/capacity in mobile networks. Due to the availability of more spectrum in the millimeter wave (mmw) band, deploying small cells that operate in this band is an attractive deployment option for these purposes. However, deploying fiber to the small cells, which is the usual way in which small cells are deployed, can end up being very expensive and impractical. Thus, employing a wireless link for connecting the small cells to the operator's network is a cheaper and practical alternative. One such solution is an Integrated Access and Backhaul (IAB) network, where the operator can utilize part of the radio resources for the backhaul link.

IAB has been studied earlier in Third Generation Partnership Project (3GPP) in the scope of Long Term Evolution (LTE) Release-10 (Rel-10). In that work, an architecture was adopted where a Relay Node (RN) has the functionality of an LTE eNodeB (eNB) and User Equipment (UE) modem. The RN is connected to a donor eNB which has a S1/X2 proxy functionality hiding the RN from the rest of the network. That architecture enabled the Donor eNB to also be aware of the UEs behind the RN and hide any UE mobility between Donor eNB and Relay Node on the same Donor eNB from the Core Network (CN). Other architectures were also considered.

For New Radio (NR), similar architecture option can also be considered. One potential difference compared to LTE (besides lower layer differences) is that a gNB-CU/DU (Centralized Unit/Distributed Unit) split is defined for NR, which allows a separation of time critical Radio Link Control (RLC)/Medium Access Control (MAC)/Physical (PHY) protocols from less time critical Radio Resource Control (RRC)/Packet Data Convergence Protocol (PDCP) protocols. Such a split could also be applied for the IAB case. Other differences anticipated in NR as compared to LTE with regards to IAB is the support of multiple hops as well as the support of redundant paths.

FIG. 1 illustrates a multi-hop deployment in an IAB network, where the IAB donor node (or IAB donor) has a wired connection to the core network and the IAB relay nodes (or IAB nodes) are wirelessly connected using NR to the IAB donor, either directly or indirectly via another IAB node. The connection between IAB donor/node and UEs is called access link, whereas the connection between two IAB nodes or between an IAB donor and an IAB node is called backhaul link.

FIG. 2 illustrates IAB terminology in adjacent hops. For example, the adjacent upstream node which is closest to the IAB donor node of an IAB node is referred to as a parent node of the IAB node. The adjacent downstream node which is further away from the IAB donor node of an IAB node is referred to as a child node of the IAB node. The backhaul link between the parent node and the IAB node is referred to as parent (backhaul) link, whereas the backhaul link between the IAB node and the child node is referred to as child (backhaul) link.

Integrated Access and Backhaul Architectures

Different architectures for supporting user plane traffic over IAB node has been captured in 3GPP TR 38.874 (version 1.0.0), namely architecture groups 1 and 2. For example, FIG. 3 illustrates one of the architectures, namely option/architecture 1a, which leverages CU/DU-split architecture. FIG. 3 shows the reference diagram for a two-hop chain of IAB-nodes underneath an IAB-donor, where IAB-node and UE connect in SA-mode to an NGC (NR Core network).

In this architecture, each IAB-node holds a Mobile Termination (MT) and a DU. In an IAB node, the MT function is a logic unit which terminates the backhaul radio interface toward the IAB parent node. Via the MT, the IAB-node connects to an upstream IAB-node or the IAB-donor. Via the DU, the IAB-node establishes RLC-channels to UEs and to MTs of downstream IAB-nodes. For MTs, this RLC-channel may be referred to as a modified RLC*. An IAB-node can connect to more than one upstream IAB-node or IAB-donor DU. The IAB-node may contain multiple DUs, but each DU part of the IAB-node has F1-C connection only with one IAB-donor CU-CP (Control Plane).

The donor node also holds a DU to support UEs and MTs of downstream IAB-nodes. The IAB-donor holds a CU for the DUs of all IAB-nodes and for its own DU. It is assumed that the DUs on an IAB-node are served by only one IAB-donor. This IAB-donor node may change through topology adaptation. Each DU of an IAB-node connects to the CU in the IAB-donor using a modified form of F1, which is referred to as F1*. F1*-U runs over RLC channels on the wireless backhaul between the MT on the serving IAB-node and the DU on the donor. An adaptation layer is added, which holds routing information, enabling forwarding. It replaces the Internet Protocol (IP) functionality of the standard F1-stack. F1*-U may carry a GPRS Tunneling Protocol (GTP)-U header for the end-to-end association between CU and DU. Furthermore, information carried inside the GTP-U header may be included into the adaption layer. Also, optimizations to RLC may be considered, such as applying Automatic Repeat Request (ARQ) only on the end-to-end connection as opposed to hop-by-hop. The right side of FIG. 3 shows two examples of such F1*-U protocol stacks. In this figure, enhancements of RLC are referred to as RLC*. The MT of each IAB-node further sustains Non-Access Stratum (NAS) connectivity to the NGC, e.g., for authentication of the IAB-node. It may further sustain a Protocol Data Unit (PDU)-session via the NGC, e.g., to provide the IAB-node with connectivity to the Operation Administration and Maintenance (OAM).

For non-standalone (NSA) operation with Evolved Packet Core (EPC), the MT is dual-connected with the network using E-UTRAN-NR Dual Connectivity (EN-DC). The IAB-node's MT sustains a Packet Data Network (PDN) connection with the EPC, e.g., to provide the IAB-node with connectivity to the OAM.

Integrated Access Backhaul Topologies

Wireless backhaul links are vulnerable to blockage, e.g., due to moving objects such as vehicles, due to seasonal changes (foliage), or due to infrastructure changes (new buildings). Such vulnerability also applies to physically stationary IAB-nodes. Also, traffic variations can create uneven load distribution on wireless backhaul links leading to local link or node congestion.

The following IAB topologies are considered in IAB: 1) Spanning tree (ST) and 2) Directed acyclic graph (DAG).

FIG. 4 illustrates an example of a spanning tree (left) and a directed acyclic graph (right). The arrows in the figure indicate the directionality of the graph edge.

One way to provide robust operation for physically fixed relays is to provide redundant links to two or more parent nodes.

FIG. 5 illustrates examples for link and route redundancy in DAG.

For a DAG, the following options can be considered:
The IAB-node is multi-connected, i.e., it has links to multiple parent nodes (see FIG. 5a).
The IAB-node has multiple routes to another node, e.g. the IAB-donor (see FIG. 5b).
Both options can be combined, i.e., the IAB-node may have redundant routes to another node via multiple parents (see FIG. 5c).

Multi-connectivity or route redundancy may be used for back-up purposes. It is also possible that redundant routes are used concurrently, e.g., to achieve load balancing, reliability, etc.

FIG. 6 illustrates different route redundancy in architecture group 1 either using single MT function or multiple MT functions.

Resource Coordination

From an IAB-node MT's point of view, as in Rel. 15, the following time-domain resources can be indicated for the parent link: Downlink time resource (DL); Uplink time resource (UL); and Flexible time resource (F).

From an IAB-node DU's point of view, the child link has the following types of time resources: Downlink time resource (DL); Uplink time resource (UL); Flexible time resource (F); and Not available time resources (NA): resources not to be used for communication on the DU child links).

Each of the downlink, uplink and flexible time-resource types of/associated with the DU child link can belong to one of two categories:
Hard (H): The corresponding time resource is always available for the DU child link;
Soft (S): The availability of the corresponding time resource for the DU child link is explicitly and/or implicitly controlled by the parent node.

An IAB node is configured with IAB-node specific resources in time available for the links. Mechanisms for scheduling coordination, resource allocation, and route selection across IAB-nodes/IAB-donors and multiple backhaul hops were studied in 3GPP TR 38.874 V16.0.0 (2018-12), "Study on Integrated Access and Backhaul", and include the following aspects:
Distributed or centralized coordination mechanisms;
Resource granularity, adaptation period, and enhancements to existing mechanisms for the required signaling (e.g. slot or symbol-level or TDD configuration pattern) provided to the IAB node;
Explicit or implicit indication of the resources;
Exchange of L1 and/or L3 measurements between IAB-nodes;
Exchange of topology related information (e.g. hop order) impacting the study of the backhaul link physical layer design;
Resource (frequency, time in terms of slot/slot format, etc.) coordination which is faster than semi-static coordination and the indication of resources within the configuration which can be dynamically and flexibly used for different links, including:
i. The need to consider the scheduling delay, IAB node processing delays, or information required to be available for the use of flexible resources;
ii. Mechanisms to schedule flexible resources (e.g. GC-Physical Downlink Control Channel (PDCCH)).

In order to support mechanisms for resource allocation for IAB nodes, semi-static configuration is supported for the configuration of IAB node DU resources. In addition, dynamic indication (L1 signaling) to an IAB node of the availability of soft resources for an IAB node DU is supported. Existing Rel.15 L1 signaling methods are the baseline, while potential enhancements (e.g. new slot formats), rules for DU/MT behavior in case of conflicts across multiple hops, and processing time constraints at the IAB node may need to be considered, according to 3GPP TR 38.874 V16.0.0 (2018-12), "study on Integrated Access and Backhaul".

Table 7.3.3-1 and Table 7.3.3-2 of 3GPP TR 38.874 V16.0.0 capture the possible combinations of DU and MT behavior. The tables assume an IAB not capable of full-duplex operation. The following definitions apply:
"MT: Tx" means that the MT should transmit if scheduled;
"DU: Tx" means that the DU may transmit;
"MT: Rx" means that the MT should be able to receive (if there is anything to receive);
"DU: Rx" means that the DU may schedule uplink transmissions from child nodes or UEs;
"MT: Tx/Rx" means that the MT should transmit if scheduled and should be able to receive, but not simultaneously;
"DU: Tx/Rx" means that the DU may transmit and may schedule uplink transmission from child nodes and UEs, but not simultaneously;
"IA" means that the DU resource is explicitly or implicitly indicated as available;
"INA" means that the DU resource is explicitly or implicitly indicated as not available;
"MT: NULL" means that the MT does not transmit and does not have to be able to receive;
"DU: NULL" means that the DU does not transmit and does not schedule uplink transmission from child nodes and UEs.

As a note, Table 7.3.3-1 applies in case of Time Division Multiplexing (TDM) operation, where there can be no simultaneous transmission in the DU and the MT, nor any simultaneous reception in the DU and the MT. Table 7.3.3-2 applies in case of Space Division Multiplexing (SDM) operation, where there can be simultaneous transmission in the DU and the MT, alternatively simultaneous reception in the DU and the MT.

Generalizations

A network node (NN) can correspond to any type of radio network node or any network node, which communicates with a UE and/or with another network node. Examples of network nodes are NodeB, base station (BS), integrated access and backhaul (IAB) node, multi-standard radio (MSR) radio node such as MSR BS, eNodeB, gNodeB. MeNB, SeNB, network controller, radio network controller (RNC), base station controller (BSC), road side unit (RSU), relay, donor node controlling relay, base transceiver station (BTS), access point (AP), transmission points, transmission nodes, RRU, RRH, nodes in distributed antenna system (DAS), core network node (e.g. MSC, MME etc.), O&M, OSS, SON, positioning node (e.g. E-SMLC) etc.

A UE can be generalized to correspond to a user terminal, or a network node like a relay node or an IAB node.

An uplink can be generalized to correspond to UL in the access link, and UL in the wireless backhaul link. Similarly, a downlink can be generalized to correspond to DL in the access link, and DL in the wireless backhaul link.

SUMMARY

Currently there exists some challenges. The IAB node is composed of MT and DU logic units. Via the MT, the IAB node connects to a parent node which can either be an IAB node or an IAB donor node. Via the DU, the IAB node establishes RLC-channels to UEs and to MTs of child IAB node(s). In the in-band half-duplex IAB context, each of the DU Downlink (DL), Uplink (UL) and Flexible (F) time-resource types can be further configured as one of two categories: Hard (H) and Soft (S). In case of hard DU resources, the DU can assume it can use the resource regardless of its impact on the MT side of the same IAB node. In case of soft DU resources, the DU can use the resource if and only if this does not impact the MTs ability to transmit or receive.

The corresponding DU and MT behaviors for different resource-type combinations defined in Tables 7.3.3-1 and 7.3.3-2 in 3GPP TR 38.874 consider typically the case when the MT and DU parts of the IAB node operate on the same frequency. However, it does not take into account the two cases when the MT/DU functionality of the IAB node operates on multiple carrier frequencies and/or when the MT and DU functionalities of the IAB node operate on different carrier frequencies.

Some embodiments herein allow to overcome or mitigate the above challenges.

For example, the DU resource type (Hard, Soft) is, if needed, configured per DU carrier frequency (i.e. per cell) with respect to each MT carrier frequency. For each IAB node, information (e.g. carrier-frequency and/or cell) about the node's capabilities to use certain MT and DU resources simultaneously are provided to the network function unit responsible for semi-static DU resource configuration. Based on the provided information, the network function unit only assigns Hard or Soft resource type to the DU time resources (on a certain DU carrier frequency) when there is no indication and/or information that DU resources can be used simultaneously with corresponding MT resources.

According to one aspect, methods performed by a network node, such as an IAB donor node or an IAB node or a gNB are provided. A first method may comprise: receiving capability information associated with a second network node, which has a first transceiver and a second transceiver, the capability information being related to an operation of the first transceiver at a first frequency and the second transceiver at a second frequency; configuring one or more resources associated with the first transceiver of the second network node based on the received capability information; sending an indication of the configured resources to the second network node.

A second method may comprise: sending to a second network node capability information for an operation of the first transceiver at a first frequency and the second transceiver at a second frequency; receiving a resource configuration for resources of the first transceiver, from the second network node; and scheduling transmissions on the first transceiver based on the received resource configuration.

According to another aspect, some embodiments include a network node (such as an IAB donor node or gNB) configured, or operable, to perform one or more functionalities and methods (e.g. actions, operations, steps, etc.) as described herein.

In some embodiments, the network node may comprise one or more communication interfaces configured to communicate with one or more other radio nodes and/or with one or more network nodes, and processing circuitry operatively connected to the communication interface, the processing circuitry being configured to perform one or more functionalities as described herein. In some embodiments, the processing circuitry may comprise at least one processor and at least one memory storing instructions which, upon being executed by the processor, configure the at least one processor to perform one or more functionalities as described herein.

In some embodiments, the network node may comprise one or more functional modules configured to perform one or more functionalities as described herein.

According to another aspect, some embodiments include a non-transitory computer-readable medium storing a computer program product comprising instructions which, upon being executed by processing circuitry (e.g., at least one processor) of the network node, configure the processing circuitry to perform one or more functionalities as described herein.

The advantages/technical benefits of the embodiments are as follows:

The embodiments provide an approach for efficient semi-static DU resource configuration, especially regarding the Hard and Soft resource types. It covers the cases when the MT/DU functionality of an IAB node operates on multiple carrier frequencies and/or when the MT and DU functionalities of the IAB node operate on different carrier frequencies. Also, it is forward-compatible with the full-duplex IAB node.

This summary is not an extensive overview of all contemplated embodiments and is not intended to identify key or critical aspects or features of any or all embodiments or to delineate the scope of any or all embodiments. In that sense, other aspects and features will become apparent to those ordinarily skilled in the art upon review of the following description of specific embodiments in conjunction with the accompanying figures.

BRIEF DESCRIPTION OF THE DRAWINGS

Exemplary embodiments will be described in more detail with reference to the following figures, in which:

FIG. 6 is a schematic illustration of a Route redundancy in architecture group 1 either using single MT function or multiple MT functions.

DETAILED DESCRIPTION

Figure 1:
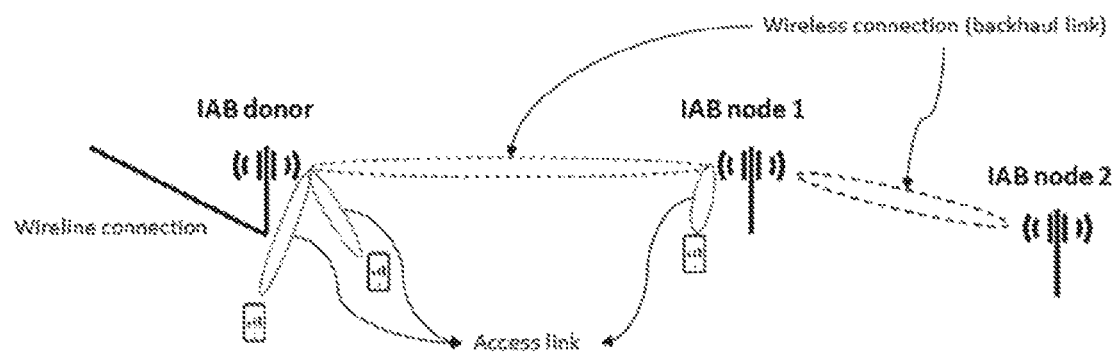
FIG. 1 illustrates a schematic illustration of a Multi-hop deployment in an integrated access and backhaul (IAB) network.
Figure 2:
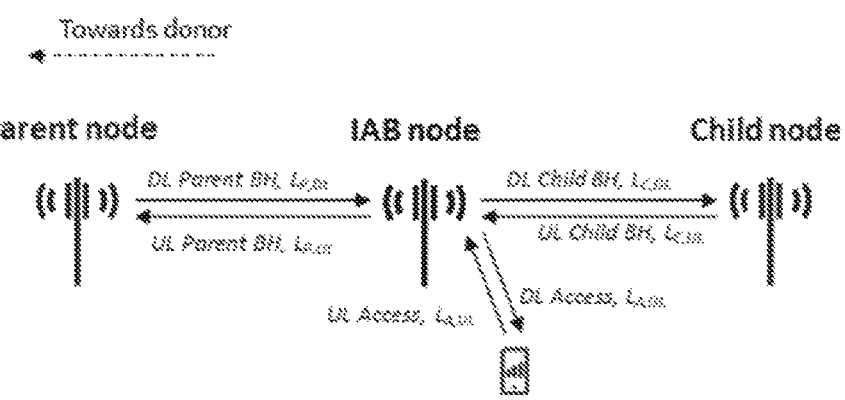
FIG. 2 illustrates IAB terminologies in adjacent hops.

The embodiments set forth below represent information to enable those skilled in the art to practice the embodiments. Upon reading the following description in light of the accompanying figures, those skilled in the art will understand the concepts of the description and will recognize applications of these concepts not particularly addressed herein. It should be understood that these concepts and applications fall within the scope of the description.

In the following description, numerous specific details are set forth. However, it is understood that embodiments may be practiced without these specific details. In other instances, well-known circuits, structures, and techniques have not been shown in detail in order not to obscure the understanding of the description. Those of ordinary skill in the art, with the included description, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

As used herein, the singular forms "a", "an" and "the" are intended to include the plural forms as well, unless the context clearly indicates otherwise. It will be further understood that the terms "comprises," "comprising," "includes," and/or "including" when used herein, specify the presence of stated features, integers, steps, operations, elements, and/or components, but do not preclude the presence or addition of one or more other features, integers, steps, operations, elements, components, and/or groups thereof.

When the half-duplex IAB node is considered with the in-band operation, the semi-static DU configuration can be introduced with Hard and Soft resource types defined on top of the traditional DL, UL and flexible (F) resource types for better intra-IAB-node MT/DU coordination. According to the definition in "3GPP TR 38.874 V16.0.0 (2018-12)", in case of hard DU resources, the DU can assume it can use the resources regardless of its impact on the MT side of the same IAB node. In case of soft DU resources, the DU can use the resources if and only if this does not impact the MT's ability to transmit or receive.

It has been further agreed that the parent node of an IAB node has the ability to be made aware of the semi-static DU resource configuration (Downlink/Uplink/Flexible/Hard/Soft/Not Available (D/U/F/H/S/NA)) of the IAB node. Assuming the parent node does not know the IAB-node capability for simultaneous DU and MT operation, configuring a certain DU time-resource as Hard means to the parent node that the corresponding MT resource is typically unavailable for communication with the parent node, because there can be resource conflicts between MT and DU on such Hard configured resources. To avoid resource conflict at the IAB node, the parent node should in practice not schedule transmission to/from the IAB node during such conflicting time-resources. Similarly, the parent node knowing a certain DU time-resource is Soft means that the parent node can assume that the corresponding MT resource is available. Those assumptions are generally valid when the MT and DU functionalities of the IAB node operate on the same carrier frequency. However, if the MT functionality of the IAB node operates on multiple carrier frequencies, making such an assumption at the parent node can be inefficient for resource utilization, since using a DU resource may impact the MT on some carrier frequencies but not on other carrier frequencies. Therefore, it would be beneficial for the parent node to obtain further information on IAB node's capability for simultaneous DU and MT operation over specific pairs of DU and MT frequencies. This would allow the parent node to better estimate the instantaneous IAB-node MT availability on a given MT carrier frequency.

Note that the MT functionality of an IAB node operating on multiple carrier frequencies can either be implemented by one MT unit operating on multiple carrier frequencies, or be implemented by multiple MT units, each operating on one carrier frequency. The present embodiments are applicable to both cases. And the same is true when it comes to the DU functionality of an IAB node operating on multiple carrier frequencies.

Consider the following case: the IAB MT functionality operates on carrier frequency $f_{MT}$ while the IAB DU functionality operates on carrier frequency $f_{DU}$, where $f_{MT}$ and $f_{DU}$ are sufficiently spaced such that the MT and DU resources can be used simultaneously (i.e., the MT and DU can operate in a Frequency Division Multiplexing (FDM) or Space Division Multiplexing (SDM) or even full Duplexing (FD) manner). In this case, configuring the DU resources as Hard or Soft does not lead to different MT and DU behaviors, since the DU can use any $f_{DU}$ associated resource without impacting MT's ability to transmit or receive on $f_{MT}$ associated resources. Specifically assigning Hard or Soft resource type to the IAB DU becomes unnecessary, which wastes configuring and signaling resources and increases complexity.

Therefore, an approach to make the Hard/Soft configuration optional to the IAB DU, based on the IAB node's multiplexing capability between the MT and the DU, is introduced.

Assume that the IAB MT functionality operates on carrier frequencies $f_{MT,1}$, $f_{MT,2}$, and $f_{MT,3}$, while the IAB DU functionality operates on carrier frequencies $f_{DU,1}$ and $f_{DU,2}$. Any of $f_{MT,1}$, $f_{MT,2}$, and $f_{MT,3}$ may be the same as any of $f_{DU,1}$ and $f_{DU,2}$ or overlapping with them or at least not sufficiently spaced apart from each other such that they cannot be used simultaneously.

It should be noted that the MT and DU functionalities can be referred to or considered as transceivers. Furthermore, an IAB node can have a plurality of MT functionalities and a plurality of DU functionalities.

The IAB node's multiplexing capability can be determined and informed as follows:

Example 1: The IAB node's multiplexing capability is represented based on DU-MT carrier-frequency combinations/pairs. For example, the IAB node has the capability to use the MT resources on frequency $f_{MT,2}$ and the DU resources on frequency $f_{DU,1}$ simultaneously, to use the MT resources on frequency $f_{MT,2}$ and the DU resources on frequency $f_{DU,2}$ simultaneously, and also to use the MT resources on frequency $f_{MT,3}$ and the DU resources on frequency $f_{DU,2}$ simultaneously. The IAB node informs such capability in terms of DU-MT frequency combinations/pairs $\{f_{DU,1}(f_{MT,2}), f_{DU,2}(f_{MT,2}), f_{DU,2}(f_{MT,3})\}$ to the network function unit responsible for semi-static DU resource configuration.

Example 2: The IAB node's multiplexing capability is represented based on the transmission-direction combinations at the DU and MT, respectively. For example, the IAB node has the capability of simultaneously performing:

DU-TX and MT-TX at $\{f_{DU,1}(f_{MT,2}), f_{DU,2}(f_{MT,2}), f_{DU,2}(f_{MT,3})\}$,
DU-TX and MT-RX at $\{f_{DU,1}(f_{MT,2})\}$,
DU-RX and MT-TX at $\{f_{DU,1}(f_{MT,2})\}$, and
DU-RX and MT-RX at $\{f_{DU,1}(f_{MT,3}), f_{DU,2}(f_{MT,2}), f_{DU,2}(f_{MT,3})\}$, where DU-TX means DU downlink transmission, DU-RX means DU uplink reception, MT-TX means MT uplink transmission, and MT-RX means MT downlink reception.

The IAB node informs such capability per transmission-direction combination in terms of DU-MT carrier-frequency combinations/pairs to the network function unit responsible for semi-static DU resource configuration.

The network function unit performs semi-static DU resource configuration based on the provided IAB multiplexing capability. When the Hard/Soft DU resource type is needed, it is configured per DU carrier frequency (i.e. per cell), i.e. as already agreed in 3GPP. However, according to the present embodiments, this configuration is done separately with respect to each MT carrier frequency. For example, the DU cell operating on $f_{DU,1}$ may have a Hard/Soft configuration with respect to $f_{MT,1}$ and potentially a different Hard/Soft configuration with respect to $f_{MT,2}$. If the DU cell associated with $f_{DU,1}$ is configured as Hard with respect to $f_{MT,1}$ while it is configured as Soft with respect to $f_{MT,2}$ within the same time resource, it means that this DU cell can use the time resource irrespective of its impact on MT on carrier frequency $f_{MT,1}$, but can only use the time resources if it does not impact the MT's ability to transmit or receive on carrier frequency $f_{MT,2}$. By knowing such an IAB DU configuration, the parent node may assume that the MT is available on carrier frequency $f_{MT,2}$, but is not available on carrier frequency $f_{MT,1}$.

The network function unit may only assign Hard or Soft resource type to the DU time resources (on a certain DU carrier frequency, with respect to a certain MT carrier frequency) when DU resources cannot be used simultaneously with corresponding MT resources.

For example, according to the above example 1, the IAB node can simultaneously use the MT and DU resources on carrier-frequency combinations/pairs $f_{DU,1}(f_{MT,2})$, $f_{DU,2}(f_{MT,2})$, and $f_{DU,2}(f_{MT,3})$, but cannot simultaneously use $f_{DU,1}(f_{MT,1})$, $f_{DU,1}(f_{MT,3})$, nor $f_{DU,2}(f_{MT,1})$. Then the network function unit only assigns Hard/Soft resource type to the DU on $f_{DU,1}$ with respect to $f_{MT,1}$ and $f_{MT,3}$, and also assigns Hard/Soft resource type to the DU on $f_{DU,2}$ with respect to $f_{MT,1}$.

The parent node could assume the MT resource is available on carrier frequencies where the corresponding DU is not configured with Hard/Soft resource type.

Generally stated, signaling of an IAB node's ability for simultaneous DU and MT operation for a given DU/MT frequency combination to the network function unit responsible for semi-static DU resource configuration is provided. Furthermore, hard/soft configuration can be done with respect to each MT carrier, i.e. not being independent of the MT carrier.

It should be noted that the network function unit responsible for semi-static DU resource configuration can be located in an IAB donor or in a CU for coordinating resources in IAB nodes.

Figure 7:
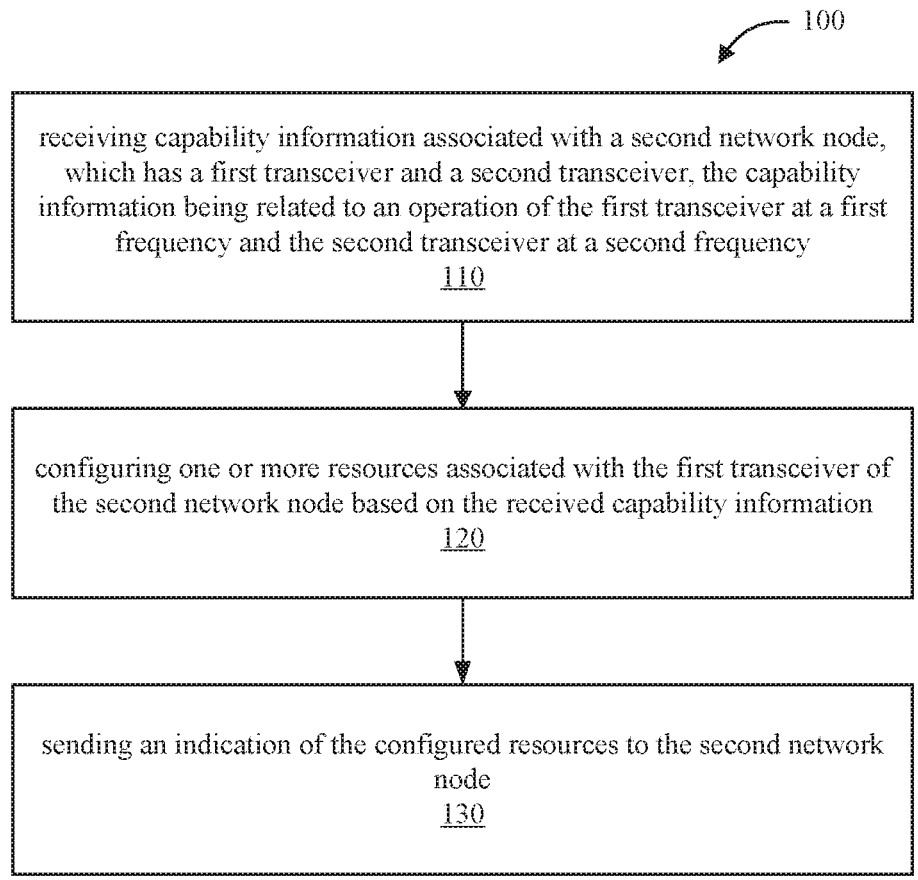
FIG. 7 is a flow chart of a method in a network node, in accordance with some embodiments.

Now turning to FIG. 7, a flow chart illustrating a method 100 in a network node, according to an embodiment, will be described. The method can be implemented in any network node, such as IAB donor node, an IAB node or a gNB/network node 320 of FIG. 9. This network node can be referred to as a first network node. It should be noted that the reference to a first or a second network node is only for purposes of distinguishing the first network node from the second network node. The first network node could be an IAB donor node or a CU of a gNB. Method 100 comprises:

Step 110: receiving capability information associated with a second network node, which has a first transceiver and a second transceiver, the capability information being related to an operation of the first transceiver at a first frequency and the second transceiver at a second frequency.

Step 120: configuring one or more resources associated with the first transceiver of the second network node based on the received capability information.

Step 130: sending an indication of the configured resources to the second network node.

For example, the second network node can be an IAB node, which may have two or more transceivers, such as MT and DU functionalities. Also, this second network node or IAB node can operate in multiple carrier frequencies and/or have the MT and DU functionalities operate in different frequencies. As such, the MTs and DUs can operate in multiple carrier frequencies, which can be different from each other, or overlapping each other or some same frequencies could be used by some MTs and DUs.

In some examples, the capability can be related to a simultaneous operation of the first transceiver and the second transceiver.

In some examples, configuring the one or more resources of the first transceiver may comprise configuring a resource as one of a hard resource, a soft resource and a resource not available.

In some examples, the configuration of the resources as hard or soft is done with respect to a specific frequency of the second transceiver (e.g. the second frequency).

In some examples, a hard resource means that the first transceiver can use the hard resource irrespective of the second transceiver's ability to transmit at the second frequency.

In some examples, a soft resource means that the first transceiver can use the soft resource only if using the soft resource by the first transceiver does not impact the second transceiver's ability to transmit or receive at the second frequency.

In some examples, the method may comprise estimating that the second transceiver is free to transmit or receive at the second frequency based on the received resource configuration for the first transceiver of the second network node.

In some examples, configuring the one or more resources may comprise assigning a hard or soft or NA type to resources of the first transceiver if the resources cannot be used simultaneously with corresponding resources associated with the second transceiver.

In some examples, resources that are not configured as soft or hard or not available resources may be considered available for transmission and/or reception by the second transceiver.

In some examples, the capability information may further comprise a transmission direction for the first transceiver at the first frequency and/or the second transceiver at the second frequency. For example, the transmission direction for the first transceiver at the first frequency and the second transceiver at the second frequency can be any one of: 1) the first transceiver transmitting a downlink transmission and the second transceiver transmitting an uplink transmission, 2) the first transmitter receiving a uplink transmission and the second transceiver transmitting a uplink transmission, 3) the first transceiver transmitting a downlink transmission and second transceiver receiving a downlink transmission, or, 4) the first transceiver receiving a uplink transmission and the second transceiver receiving a downlink transmission.

In some examples, the second network node may operate on multiple carrier frequencies, e.g. the first and second transceiver can operate on the multiple carrier frequencies.

In some examples, the method may further comprise, for each different pair of first and second frequencies in the multiple carrier frequencies, receiving a corresponding capability information.

In some examples, the first frequency can be different from the second frequency.

In some examples, the first transceiver can be a distributed unit (DU) of an IAB node.

In some examples, the second transceiver can be a Mobile Termination (MT) of the IAB node.

In some examples, the second network node can be an IAB node.

In some examples, the first network node can be an IAB donor, a parent IAB node or a network management function.

It should be noted that configuration of the DU resources as hard or soft resources or not available could be referred to as DU H/S/NA resource types.

Figure 8:
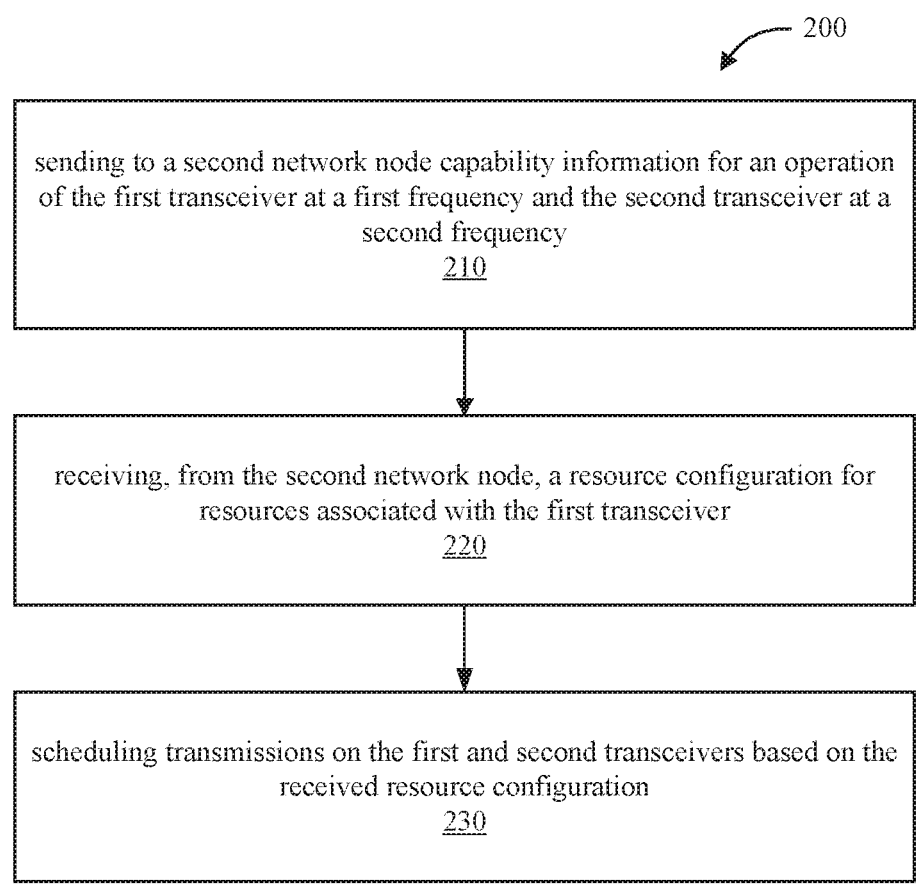
FIG. 8 is a flow chart of another method in a network node, in accordance with some embodiments.

Turning to FIG. 8 now, a flow chart illustrating a method 200 in a first network node, according to an embodiment, will be described. The method can be implemented in any network node e.g. gNB or IAB node. The network node may be the network node 320 of FIG. 9, for example. The first network node may comprise a plurality of transceivers (e.g. MT and DU functionalities), such as a first transceiver and a second transceiver. The first network node also operates in multiple carrier frequencies and/or have the MT and DU functionalities operate in different frequencies. Method 200 comprises:

Step 210: sending to a second network node capability information for an operation of the first transceiver at a first frequency and the second transceiver at a second frequency.

Step 220: receiving a resource configuration for resources associated with the first transceiver, from the second network node.

Step 230: scheduling transmissions on the first transceiver based on the received resource configuration.

In some examples, method 200 can further prepare for transmissions on the second transceiver based on the received resource configuration for the first transceiver. For example, the parent node can schedule transmissions on the MT/second transceiver, which may depend partly on the resource configuration of the DU/first transceiver.

In some examples, the capability can be related to a simultaneous operation of at least the first transceiver and the second transceiver.

In some examples, the resource configuration of the resources can comprise a resource configured as one of a hard resource, a soft resource and a resource not available.

In some examples, the configuration of the resources as hard or soft can be done with respect to a specific frequency of the second transceiver (e.g. the second frequency).

In some examples, a hard resource means that the first transceiver can use the hard resource irrespective of the second transceiver's ability to transmit at the second frequency.

In some examples, a soft resource means that the first transceiver can use the soft resource only if using the soft resource by the first transceiver does not impact the second transceiver's ability to transmit or receive at the second frequency.

In some examples, the resource configuration can further comprise resources associated with the first transceiver being assigned to a hard type, if the one or more resources cannot be used simultaneously with corresponding resources associated with the second transceiver.

In some examples, resources that are not configured as soft or hard or not available resources can be considered as available for transmission by the second transceiver.

In some examples, the capability information can further comprise a transmission direction for the first transceiver at the first frequency and the second transceiver at the second frequency. For example, the transmission direction for the first transceiver at the first frequency and the second transceiver at the second frequency can be one of the following: 1) the first transceiver transmitting a downlink transmission and the second transceiver transmitting an uplink transmission, 2) the first transmitter receiving a uplink transmission and the second transceiver transmitting a uplink transmission, 3) the first transceiver transmitting a downlink transmission and second transceiver receiving a downlink transmission, or, 4) the first transceiver receiving a uplink transmission and the second transceiver receiving a downlink transmission In some examples, the first network node can operate on multiple carrier frequencies. For example, the first and second transceivers can operate on multiple carrier frequencies.

In some examples, the method may further comprise, for each different pair of first and second frequencies in the multiple carrier frequencies, sending a corresponding capability information to the second network node.

In some examples, the first frequency can be different from the second frequency.

In some examples, the first transceiver can be a distributed unit (DU).

In some examples, the second transceiver can be a Mobile Termination (MT).

In some examples, the first network node can be an IAB node.

In some examples, the second network node can be an IAB donor or a parent IAB node, or a network management function.

Figure 9:
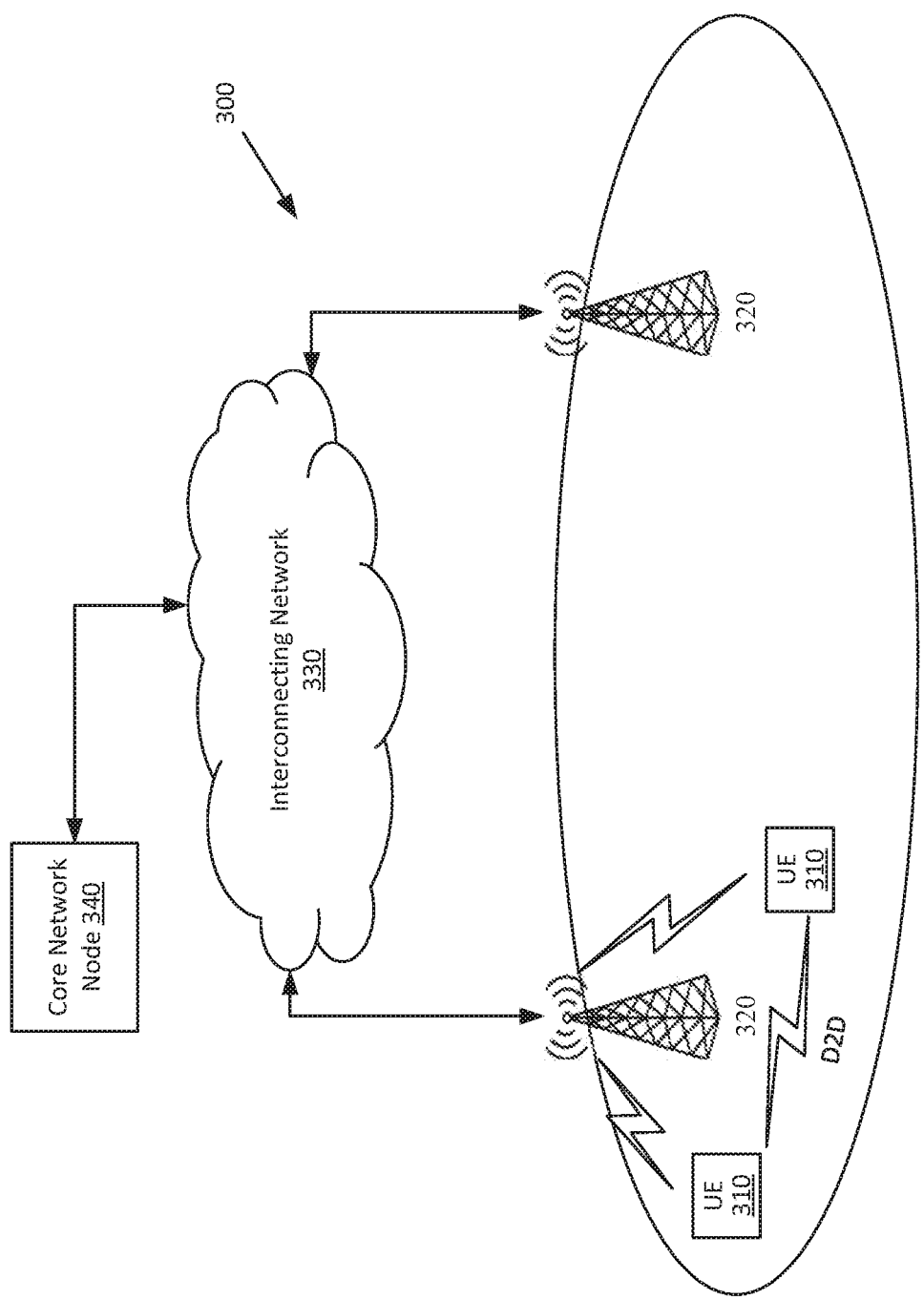
FIG. 9 illustrates one example of a wireless communications system in which embodiments of the present disclosure may be implemented.

FIG. 9 illustrates an example of a wireless network 300 that may be used for wireless communications. Wireless network 300 includes UEs 310 and a plurality of radio network nodes 320 (e.g., Node Bs (NBs) Radio Network Controllers (RNCs), evolved NBs (eNBs), next generation NB (gNBs), etc.) directly or indirectly connected to a core network 330 which may comprise various core network nodes. The network 300 may use any suitable radio access network (RAN) deployment scenarios, including Universal Mobile Telecommunication System (UNITS) Terrestrial Radio Access Network (UTRAN), and Evolved UNITS Terrestrial Radio Access Network (EUTRAN). UEs 310 may be capable of communicating directly with radio network nodes 320 over a wireless interface. In certain embodiments, UEs may also be capable of communicating with each other via device-to-device (D2D) communication. In certain embodiments, network nodes 320 may also be capable of communicating with each other, e.g. via an interface (e.g. X2 in LTE or other suitable interface).

As an example, UE 310 may communicate with radio network node 320 over a wireless interface. That is, UE 310 may transmit wireless signals to and/or receive wireless signals from radio network node 320. The wireless signals may contain voice traffic, data traffic, control signals, and/or any other suitable information. In some embodiments, an area of wireless signal coverage associated with a radio network node 320 may be referred to as a cell.

It should be noted that a UE may be a wireless device, a radio communication device, target device, device to device (D2D) UE, machine type UE or UE capable of machine to machine communication (M2M), a sensor equipped with UE, iPAD, Tablet, mobile terminals, smart phone, laptop embedded equipped (LEE), laptop mounted equipment (LME), Universal Serial Bus (USB) dongles, Customer Premises Equipment (CPE) etc.

In some embodiments, the "network node" can be any kind of network node which may comprise of a radio network node such as a radio access node (which can include a base station, radio base station, base transceiver station, base station controller, network controller, gNB, NR BS, evolved Node B (eNB), Node B, Multi-cell/multicast Coordination Entity (MCE), relay node, access point, radio access point, Remote Radio Unit (RRU), Remote Radio Head (RRH), a multi-standard BS (also known as MSR BS), etc.), a core network node (e.g., MME, SON node, a coordinating node, positioning node, MDT node, etc.), or even an external node (e.g., 3rd party node, a node external to the current network), etc. The network node may also comprise a test equipment.

In certain embodiments, network nodes 320 may interface with a radio network controller (not shown). The radio network controller may control network nodes 320 and may provide certain radio resource management functions, mobility management functions, and/or other suitable functions. In certain embodiments, the functions of the radio network controller may be included in the network node 320. The radio network controller may interface with the core network node 340. In certain embodiments, the radio network controller may interface with the core network node 340 via the interconnecting network 330.

The interconnecting network 330 may refer to any interconnecting system capable of transmitting audio, video, signals, data, messages, or any combination of the preceding. The interconnecting network 330 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node 340 may manage the establishment of communication sessions and various other functionalities for wireless devices 310. Examples of core network node 340 may include MSC, MME, SGW, PGW, O&M, OSS, SON, positioning node (e.g. E-SMLC), MDT node, etc. Wireless devices 110 may exchange certain signals with the core network node 340 using the non-access stratum layer. In non-access stratum signaling, signals between wireless devices 310 and the core network node 340 may be transparently passed through the radio access network. In certain embodiments, network nodes 320 may interface with one or more other network nodes over an internode interface. For example, network nodes 320 may interface each other over an X2 interface.

Although FIG. 9 illustrates a particular arrangement of network 300, the present disclosure contemplates that the various embodiments described herein may be applied to a variety of networks having any suitable configuration. For example, network 300 may include any suitable number of wireless devices 310 and network nodes 320, as well as any additional elements suitable to support communication between wireless devices or between a wireless device and another communication device (such as a landline telephone). The embodiments may be implemented in any appropriate type of telecommunication system supporting any suitable communication standards and using any suitable components, and are applicable to any radio access technology (RAT) or multi-RAT systems in which the wireless device receives and/or transmits signals (e.g., data). While certain embodiments are described for NR and/or LTE, the embodiments may be applicable to any RAT, such as UTRA, E-UTRA, narrow band internet of things (NB-IoT), WiFi, Bluetooth, next generation RAT (NR, NX), 4G, 5G, L FDD/TDD, etc.

Figure 3:
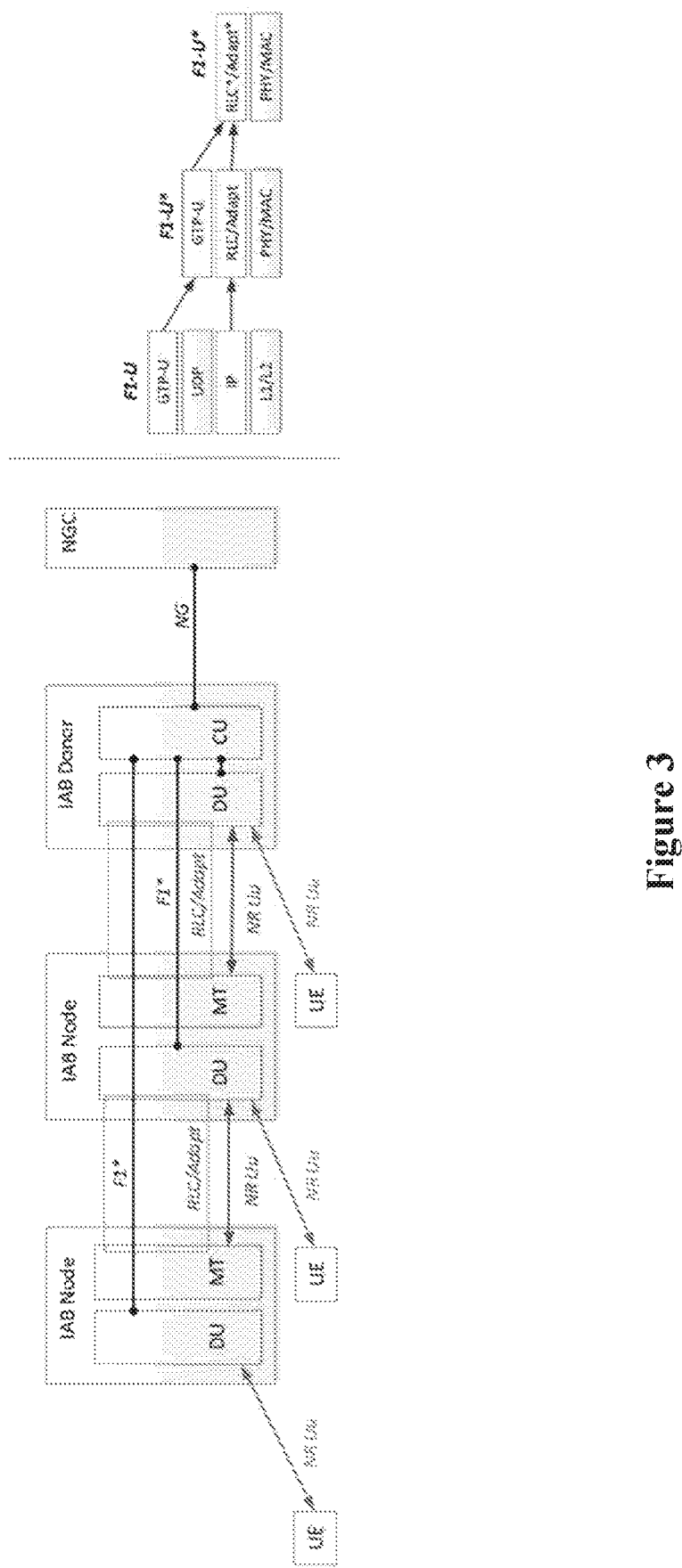
FIG. 3 is a schematic illustration of a Reference diagram for architecture 1a (SA-mode with NGC).
Figure 4:
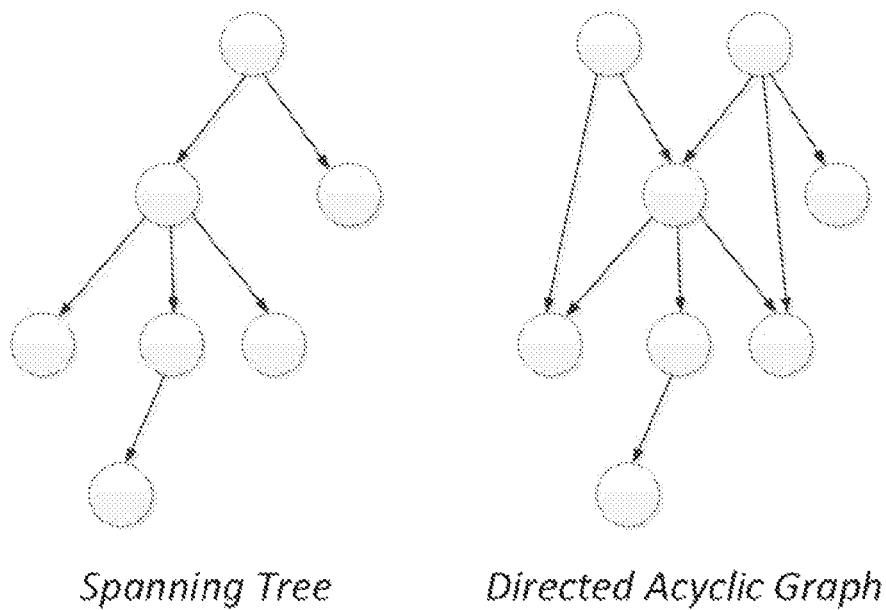
FIG. 4 is a schematic illustration of examples for a spanning tree and a directed acyclic graph (DAG). The arrows indicate the directionality of the graph edge.
Figure 5:
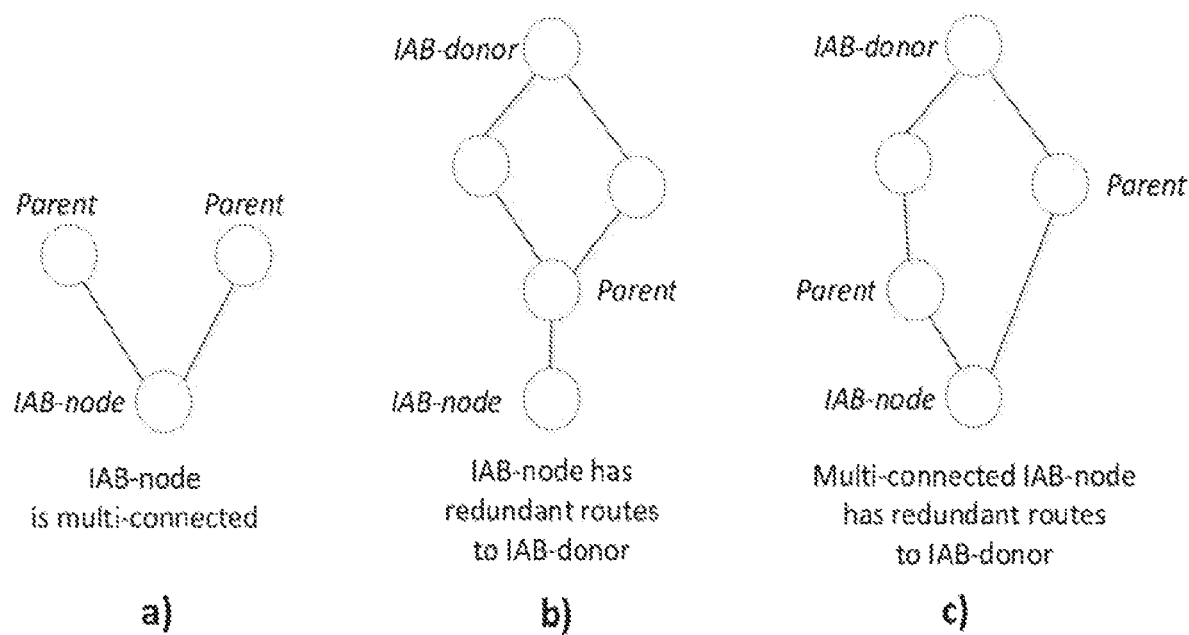
FIG. 5 is a schematic illustration of examples for link- and route redundancy in DAG.

Furthermore, the structure of the network node 320 can have a split structure, where the network node 320 has a centralized unit (CU), and a distributed unit (DU) and a Mobile Termination (MT) unit/functionality. Also, the network node 320 can be an IAB node or IAB donor node. As illustrated in FIGS. 3 and 9, the IAB donor may have DU and CU functionalities and is connected to a plurality of IAB nodes, for example. Also, the IAB donor may be a non-split node.

The communication system 300 may itself be connected to a host computer (not shown), which may be embodied in the hardware and/or software of a standalone server, a cloud-implemented server, a distributed server or as processing resources in a server farm. The host computer may be under the ownership or control of a service provider or may be operated by the service provider or on behalf of the service provider. The connections between the communication system 300 and the host computer may extend directly from the core network 340 to the host computer or may extend via the intermediate network 330.

The communication system of FIG. 9 as a whole enables connectivity between one of the connected wireless devices (WDs) 310 and the host computer. The connectivity may be described as an over-the-top (OTT) connection. The host computer and the connected WDs 310 are configured to communicate data and/or signaling via the OTT connection, using an access network, the core network 340, any intermediate network 330 and possible further infrastructure (not shown) as intermediaries. The OTT connection may be transparent in the sense that at least some of the participating communication devices through which the OTT connection passes are unaware of routing of uplink and downlink communications.

The host computer may provide host applications which may be operable to provide a service to a remote user, such as a WD 310 connecting via an OTT connection terminating at the WD 310 and the host computer. In providing the service to the remote user, the host application may provide user data which is transmitted using the OTT connection. The "user data" may be data and information described herein as implementing the described functionality. In one embodiment, the host computer may be configured for providing control and functionality to a service provider and may be operated by the service provider or on behalf of the service provider. The host computer may be enabled to observe, monitor, control, transmit to and/or receive from the network node 320 and or the wireless device 310.

One or more of the various embodiments in this disclosure improve the performance of OTT services provided to the WD 310 using the OTT connection. More precisely, the teachings of some of these embodiments may improve the data rate, latency, and/or power consumption and thereby provide benefits such as reduced user waiting time, relaxed restriction on file size, better responsiveness, extended battery lifetime, etc.

Figure 10:
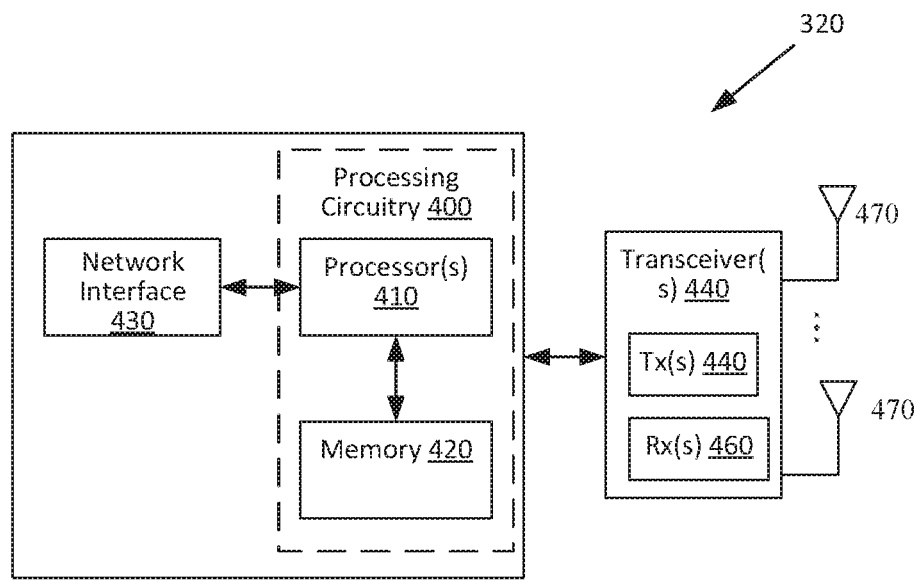
FIGS. 10 and 11 are block diagrams that illustrate a network node according to some embodiments of the present disclosure.

FIG. 10 is a schematic block diagram of a network node 320 according to some embodiments of the present disclosure. As illustrated, the network node 320 includes a processing circuitry 400 comprising one or more processors 410 (e.g., CPUs, ASICs, FPGAs, and/or the like) and memory 420. The network node also comprises a network interface 430. The network node 320 also includes one or more transceivers 440 that each include one or more transmitters 450 and one or more receivers 460 coupled to one or more antennas 470. In some embodiments, the functionality of the network node 310 described above may be fully or partially implemented in software that is, e.g., stored in the memory 420 and executed by the processor(s) 410. For example, the processor 410 can be configured to perform the method 100 of FIG. 7 or method 200 of FIG. 8. The network node 320 can be an IAB donor node or an IAB node.

Figure 11:
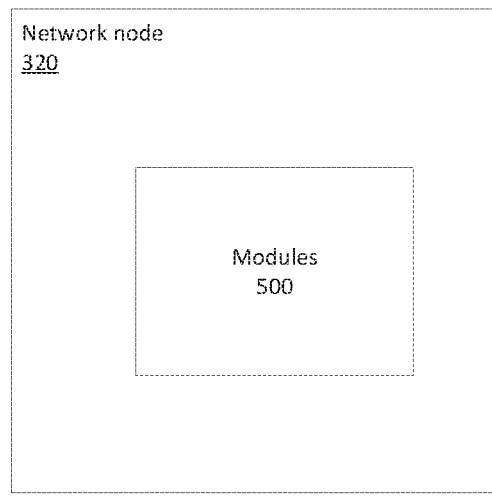

FIG. 11 is a schematic block diagram of the network node 320 according to some other embodiments of the present disclosure. The network node 320 includes one or more modules 500, each of which is implemented in software. The module(s) 500 provide the functionality of the network node 320 described herein. The module(s) 500 may comprise, for example, a receiving module operable to perform step 110 of FIG. 7 and step 220 of FIG. 8, a configuring module operable to perform step 120 of FIG. 7. Furthermore, the module(s) 600 may comprise, for example, a sending module operable to perform step 130 of FIG. 7 and step 210 of FIG. 8 and a scheduling module operable to perform step 230 of FIG. 8.

Figure 12:
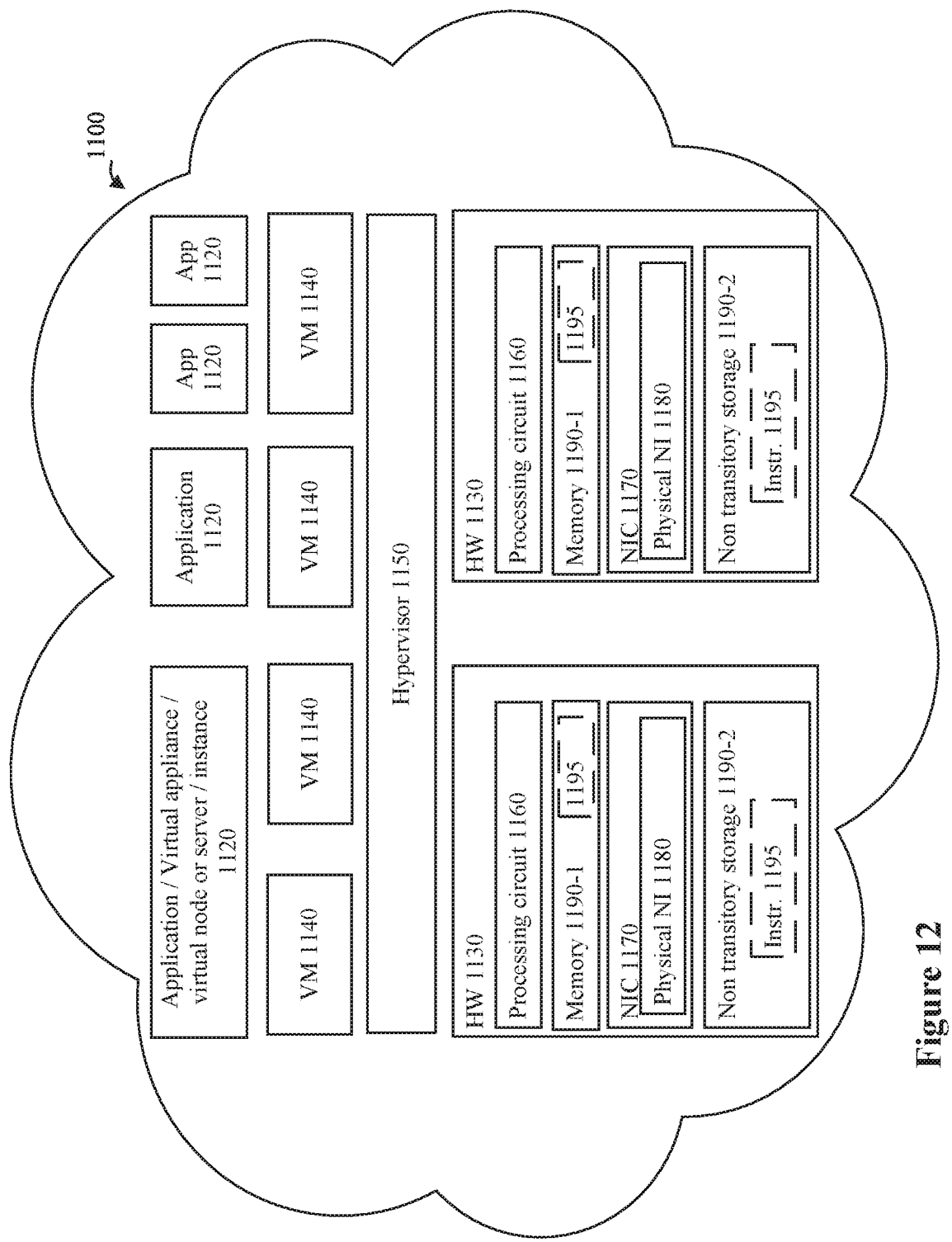
FIG. 12 illustrates a virtualized environment of a network node, according to some embodiments of the present disclosure.

FIG. 12 is a schematic block diagram that illustrates a virtualized embodiment of the wireless device 310 or network node 320, according to some embodiments of the present disclosure. As used herein, a "virtualized" node 1100 is a network node 320 or wireless device 310 in which at least a portion of the functionality of the network node 320 or wireless device 310 is implemented as a virtual component (e.g., via a virtual machine(s) executing on a physical processing node(s) in a network(s)). For example, in FIG. 11, there is provided an instance or a virtual appliance 1120 implementing the methods or parts of the methods of some embodiments. The one or more instance(s) runs in a cloud computing environment 1100. The cloud computing environment provides processing circuits 1130 and memory 1190-1 for the one or more instance(s) or virtual applications 1120. The memory 1190-1 contains instructions 1195 executable by the processing circuit 1160 whereby the instance 1120 is operative to execute the methods or part of the methods described herein in relation to some embodiments.

The cloud computing environment 1100 comprises one or more general-purpose network devices including hardware 1130 comprising a set of one or more processor(s) or processing circuits 1160, which may be commercial off-the-shelf (COTS) processors, dedicated Application Specific Integrated Circuits (ASICs), or any other type of processing circuit including digital or analog hardware components or special purpose processors, and network interface controller (s) (NICs) 1170, also known as network interface cards, which include physical Network Interface 1180. The general-purpose network device also includes non-transitory machine readable storage media 1190-2 having stored therein software and/or instructions 1195 executable by the processor 1160. During operation, the processor(s)/processing circuits 1160 execute the software/instructions 1195 to instantiate a hypervisor 1150, sometimes referred to as a virtual machine monitor (VMM), and one or more virtual machines 1140 that are run by the hypervisor 1150.

A virtual machine 1140 is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes. Each of the virtual machines 1140, and that part of the hardware 1130 that executes that virtual machine 1140, be it hardware 1130 dedicated to that virtual machine 1140 and/or time slices of hardware 1130 temporally shared by that virtual machine 1140 with others of the virtual machine(s) 1140, forms a separate virtual network element(s) (VNE).

The hypervisor 1150 may present a virtual operating platform that appears like networking hardware to virtual machine 1140, and the virtual machine 1140 may be used to implement functionality such as control communication and configuration module(s) and forwarding table(s), this virtualization of the hardware is sometimes referred to as network function virtualization (NFV). Thus, NFV may be used to consolidate many network equipment types onto industry standard high volume server hardware, physical switches, and physical storage, which can be located in Data centers, and customer premise equipment (CPE). Different embodiments of the instance or virtual application 1120 may be implemented on one or more of the virtual machine(s) 1140, and the implementations may be made differently.

In some embodiments, a carrier comprising the aforementioned computer program product is provided. The carrier is one of an electronic signal, an optical signal, a radio signal, or a computer readable storage medium (e.g., a non-transitory computer readable medium such as memory).

Some embodiments may be represented as a non-transitory software product stored in a machine-readable medium (also referred to as a computer-readable medium, a processor-readable medium, or a computer usable medium having a computer readable program code embodied therein). The machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile), or similar storage mechanism. The machine-readable medium may contain various sets of instructions, code sequences, configuration information, or other data, which, when executed, cause a processor to perform steps in a method according to one or more of the described embodiments. Those of ordinary skill in the art will appreciate that other instructions and operations necessary to implement the described embodiments may also be stored on the machine-readable medium. Software running from the machine-readable medium may interface with circuitry to perform the described tasks.

The above-described embodiments are intended to be examples only. Alterations, modifications and variations may be effected to the particular embodiments by those of skill in the art without departing from the scope of the description, which is defined solely by the appended claims.

What is claimed is:

1. A method in a first network node, the method comprising:
   receiving capability information associated with a second network node, which has a first transceiver and a second transceiver, the capability information being related to the first transceiver and the second transceiver operating simultaneously on a frequency pair with the first transceiver operating at a first frequency of the frequency pair and the second transceiver operating at a second frequency of the frequency pair;
   configuring one or more resources associated with the first transceiver of the second network node based on the received capability information; and
   sending an indication of the configured resources to the second network node; wherein the capability information further comprises a transmission direction for the first transceiver at the first frequency, and the second transceiver at the second frequency.

2. The method of claim 1, wherein configuring the one or more resources associated with the first transceiver comprises configuring a resource as one of a hard resource, a soft resource and a resource not available.

3. The method of claim 2, wherein the configuration of the resources as hard or soft is done with respect to the second frequency of the second transceiver.

4. The method of claim 2, wherein a hard resource means that the first transceiver can use the hard resource irrespective of the second transceiver's ability to transmit at the second frequency.

5. The method of claim 2, wherein a soft resource means that the first transceiver can use the soft resource only if using the soft resource by the first transceiver does not impact the second transceiver's ability to transmit or receive at the second frequency.

6. The method of claim 4, further comprising estimating that the second transceiver is free to transmit or receive at the second frequency based on the received resource configuration for the first transceiver of the second network node.

7. The method of claim 2, wherein configuring the one or more resources comprising assigning a hard or soft or not available type to resources of the first transceiver if the one or more resources cannot be used simultaneously with corresponding resources associated with the second transceiver.

8. The method of claim 1, wherein resources that are not configured as soft or hard or not available resources are considered available for transmission, or reception, or, transmission and reception by the second transceiver.

9. The method of claim 1, wherein the transmission direction for the first transceiver at the first frequency and the second transceiver at the second frequency is one of the first transceiver transmitting a downlink transmission and the second transceiver transmitting an uplink transmission, the first transmitter receiving a uplink transmission and the second transceiver transmitting a uplink transmission, the first transceiver transmitting a downlink transmission and second transceiver receiving a downlink transmission, and, the first transceiver receiving a uplink transmission and the second transceiver receiving a downlink transmission.

10. The method of claim 1, wherein the first transceiver and the second transceiver operate on multiple carrier frequencies.

11. The method of claim 10, wherein receiving capability information comprises receiving, for each different pair of first and second frequencies in the multiple carrier frequencies, receiving a corresponding capability information.

12. The method of claim 1, wherein the first frequency is different from the second frequency.

13. A network node comprising a communication interface and processing circuitry connected thereto and configured to:
   receive capability information associated with a second network node, which has a first transceiver and a second transceiver, the capability information being related to the first transceiver and the second transceiver operating simultaneously on a frequency pair with the first transceiver operating at a first frequency of the frequency pair and the second transceiver operating at a second frequency of the frequency pair;
   configure one or more resources associated with the first transceiver of the second network node based on the received capability information; and
   send an indication of the configured resources to the second network node; wherein the capability information further comprises a transmission direction for the first transceiver at the first frequency, and the second transceiver at the second frequency.

14. A method in a first network node having a first transceiver and a second transceiver, the method comprising:
   sending to a second network node capability information, the capability information being related to the first transceiver and the second transceiver operating simultaneously on a frequency pair with the first transceiver operating at a first frequency of the frequency pair and the second transceiver operating at a second frequency of the frequency pair;
   receiving, from the second network node, a resource configuration for resources associated with the first transceiver; and
   scheduling transmissions on the first transceiver based on the received resource configuration; wherein the capability information further comprises a transmission direction for the first transceiver at the first frequency and the second transceiver at the second frequency.

15. The method of claim 14, wherein the resource configuration of the resources comprises a resource configured as one of a hard resource, a soft resource and a resource not available.

16. The method of claim 15, wherein the configuration of the resources as hard or soft is done with respect to the second frequency of the second transceiver.

17. The method of claim 14, wherein the transmission direction for the first transceiver at the first frequency and the second transceiver at the second frequency is one of the first transceiver transmitting a downlink transmission and the second transceiver transmitting an uplink transmission, the first transmitter receiving a uplink transmission and the second transceiver transmitting a uplink transmission, the first transceiver transmitting a downlink transmission and second transceiver receiving a downlink transmission, and, the first transceiver receiving a uplink transmission and the second transceiver receiving a downlink transmission.

18. The method of claim 14, wherein the first transceiver and second transceiver operate on multiple carrier frequencies and wherein sending the node capability comprises, for each different pair of first and second frequencies in the multiple carrier frequencies, sending a corresponding capability information to the second network node.

\* \* \* \* \*